June 29, 1937.    C. D. BARBULESCO    2,084,995
INDICATING INSTRUMENT
Original Filed Feb. 4, 1935
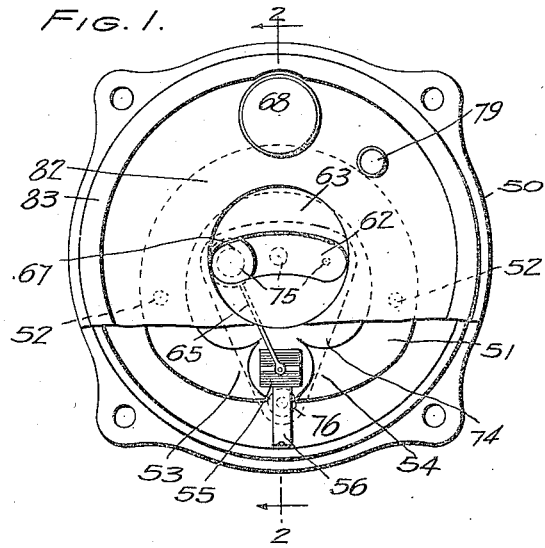
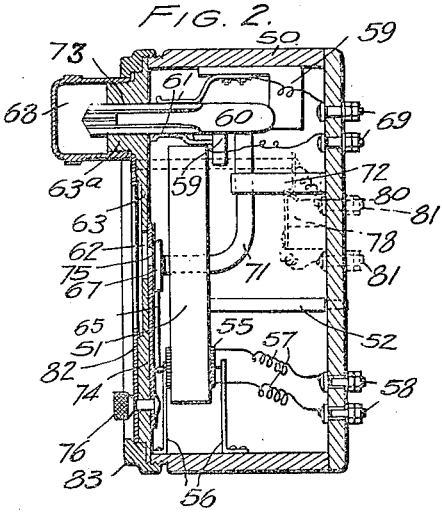
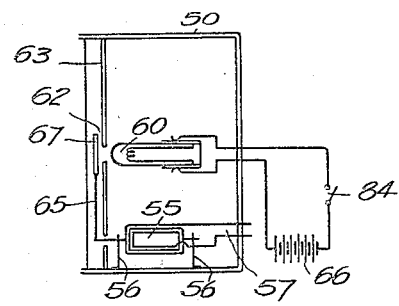
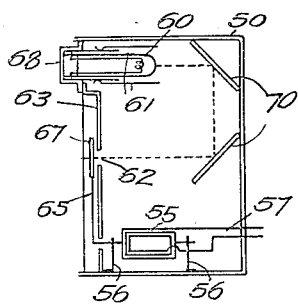
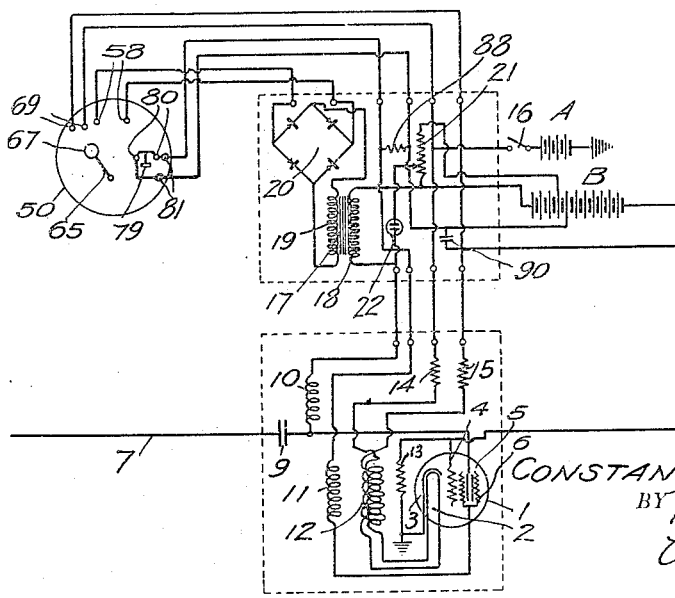
INVENTOR
CONSTANTIN D. BARBULESCO
BY Robert V. Laughlin
Clade Koontz
ATTORNEYS Patented June 29, 1937

2,084,995

UNITED STATES PATENT OFFICE 2,084,995

INDICATING INSTRUMENT

Constantin D. Barbulesco, Dayton, Ohio

Original application February 4, 1935, Serial No. 4,921. Divided and this application October 18, 1935, Serial No. 45,556

5 Claims. (Cl. 177—311)

(Granted under the act of March 3, 1883, as amended April 30, 1928; 370 O. G. 757)

The invention described herein may be manufactured and used by or for the Government for governmental purposes, without the payment to me of any royalty thereon.

My invention relates broadly to indicating instruments and more particularly to a quick acting luminous indicator.

This application is a division of my application Serial No. 4,921, filed February 4, 1935, for Ultra-high frequency marker beacon system.

One of the objects of my invention is to provide a construction of indicating instrument having minimum mechanical inertia for responding to a signal impulse and representing to an observer the position of a mobile body on which the indicating instrument is located with respect to a signal transmitter.

Another object of my invention is to provide a construction of luminous indicator for providing a flash signal under conditions of change in the electrical conditions of the circuit in which the indicator is connected and which will be positive and rugged in operation, and operative even under conditions of severe vibration.

Still another object of my invention is to provide a simplified construction of luminous indicating device in which the luminous device, such as an incandescent or neon lamp may be renewed from time to time from a convenient position on the instrument to insure against failure of the instrument due to a deteriorated or burned out luminous device.

A further object of my invention is to provide a sensitive indicating instrument adapted to respond to a change in electrical condition in a circuit at the same time that the parts of the instrument are rugged and stable in design, and operative even under conditions of severe vibration.

A still further object of my invention is to provide a construction of flash indicator adapted to be mounted on the instrument board of an aircraft for flashing a signal to the pilot under conditions of change in the electrical circuit connected with the indicator, and wherein the parts of the indicator are so constructed as to insure positive and continued operation of the indicator under conditions encountered in the blind landing of aircraft.

Other and further objects of my invention reside in the construction of an indicating instrument set forth more fully in the specification hereinafter following, by reference to the accompanying drawing, in which:

Figure 1 is a front elevation with parts broken away showing the indicating instrument of my invention; Fig. 2 is a cross sectional view of the indicating instrument illustrated in Fig. 1; Fig. 3 is a schematic view of a modified form of indicating instrument embodying my invention; Fig. 4 is a schematic view of a further modified form of an indicating instrument embodying my invention; and Fig. 5 is a diagrammatic circuit arrangement of a signal receiving circuit employed in blind landing and showing the connection of the indicating instrument of my invention therewith.

I have illustrated the indicating instrument of my invention as particularly adapted for use in systems of blind landing of aircraft of the character set forth more fully in my copending application Serial No. 4,921, filed February 4, 1935, for Ultra-high frequency marker beacon system, and in the application of A. F. Hegenberger, Serial No. 2,887, filed January 12, 1935, for Radio system and method of navigation.

However, I desire that it be understood that the indicating instrument of my invention may be employed in other electrical circuits which require quick luminous response to a transmitted signal, and where both electrical and mechanical inertia of the circuits and the operating parts of the indicating instrument must be maintained at an absolute minimum. In systems of blind landing the conditions under which an indicating instrument must operate are extremely severe. I have found that vibration of the aircraft often renders sensitive relays inoperative at the very time when the successful operation of such device is of the utmost importance. The signal energy available after detection is often exceedingly small, and yet when sensitive relays which will respond to such small energy are employed such relays are often upset by the vibration of the aircraft. Moreover, relays are sometimes sluggish in operation and will not respond in the infinitesimal time period required for the flash signal as the aircraft passes through the electromagnetic field established by the marker beacon in a predetermined position with respect to the landing field.

In order, therefore, to produce a flash of light with the minute amount of energy available I have associated a direct current meter with the detector circuit and with a single lighting circuit in such manner that while each operates independently of the other the effect of the latter is not made known until the former is in operation.

Referring more particularly to the drawing the indicating instrument is shown as including a case 50 in which there is supported a permanent magnet 51 on any suitable supporting means, such as pedestals 52. The permanent magnet 51 terminates in poles 53 at 54 between which the armature member or movable coil 55 is pivotally mounted on suitable supports 56. The armature member 55 is connected through flexible leads 57 with binding post 58 to which electrical connection may be made to the signal actuating circuit. The case 50 includes a support 59 for mounting the luminous device or light bulb 60, the light rays of which are observed from the front of the indicating instrument. The luminous device 60 may be an incandescent lamp or a neon tube secured between suitable spring contacts 61 which serve as terminals for the lighting circuit. The luminous device 60 is inserted through an aperture 73 in the instrument panel 63. The instrument panel 63 is projected forward adjacent the recessed portion thereof, and is screw-threaded as indicated at 63a to receive the cap 68. The cap 68 is substantially cylindrical in shape, and is interiorly screw-threaded to engage the external screw threads on the projecting portion 63a of the panel 63.

The luminous device 60 projects forward beyond the front of the projecting portion 63a of panel 63, so that by removing the cap 68 the luminous device may be very readily withdrawn or inserted in position. Should the luminous device 60 burn out or deteriorate, it is a simple matter to replace the luminous device by withdrawing the luminous device from the front of the panel and renewing the device by inserting a similar device through the front of the panel for engagement with the contacts 61. The replacement of a burned-out luminous device is, therefore, very quickly accomplished. The connection of the luminous device 60 to a lighting circuit is accomplished through leads connecting to binding post 69. Light rays are transmitted from the light source 60 to a position centrally of the indicating instrument by means of a bent glass rod 71 supported by a suitable bracket 72. The end of the bent glass rod 71 terminates immediately behind an opening 62 in the instrument panel 63. The effective portion of opening 62 is normally maintained closed by means of a disc 67 which is carried by an arm 65 attached to the movable shaft of armature member 55. The effective size of the light opening 62 is governed by means of an adjustable disc 74 having a series of apertures 75 of different sizes therein. The adjustable disc 74 may be shifted by means of an adjusting member 76 from the front of the panel to bring any one of the openings 75 into register with the end of the bent rod 71, so that the size of the flash signal may be regulated.

That is to say, should the disc 74 be angularly shifted to bring the smallest aperture 75 into register with the end of the bent rod 71, the flash signal which is rendered visible when the disc 67 is shifted out of the path of the aperture 75 is relatively small. On the other hand, should the disc 74 be angularly shifted to bring the largest aperture 75 into alignment with the end of the bent rod 71, the flash signal will be of relatively greater size. The size of the aperture which is uncovered by the disc 67 becomes important when different conditions at different landing fields are encountered.

In order to provide for the testing of the indicating device when the aircraft on which the instrument is located may be out of the range of a marker beacon, I mount a testing device directly on the instrument panel. The testing device comprises a switch 78 mounted interiorly of casing 50 and which is operative from the exterior of the case by moving control button 79, which serves to open and close contacts 80. Contacts 80 are connected through binding post 81 with a resistor 86 in the circuit with the screen grid of the signal receiving system which will be fully described in connection with Fig. 5. The sudden fluctuation in plate current when changing the potential on the screen grid is sufficient to produce a movement of armature 55 sufficient to move the shutter 67 and indicate to the observer that the indicating instrument is in operating condition.

The front of the panel may be covered by a suitable facing member 82. A retaining ring 83 is provided for securing the front panel and the associated parts thereof on the front of case 50 in a position in which it may be readily removed and replaced.

The construction of the indicating instrument of my invention may be modified in various forms as shown, for example, in Fig. 3, wherein the light bulb or light device 60 is disposed immediately behind the opening 62 in the panel 63. As the signal impulse actuates the armature member 55, arm 65 is shifted, thus removing disc 67 from a position obstructing the path of light rays from light source 60 and effecting a flash signal. I have shown the light source 60 connected to a suitable source of potential such as battery 66, the circuit to which may be opened through switch 84.

I may also modify the construction of the indicating instrument to that shown in Fig. 4 in which the light source 60 may be readily renewed from time to time by removal of the cap 68 and light rays directed through the central aperture 62 by an arrangement of mirrors which I have indicated at 70. In this form of the invention the number of parts is reduced to a minimum, and at the same time replacement of the lighting device may be readily effected.

In Fig. 5 I have illustrated the manner in which the indicating instrument of my invention is connected when the device is used as a flash indicator in blind landing. An electron tube detector 1 of the heater type having a screen grid is provided. The heater is indicated at 2 for rendering the cathode 3 electron emitting. The control grid is indicated at 4 and the anode is shown at 5. The screen grid is indicated at 6. The two halves of the doublet antenna with which the circuit is associated are shown at 7 and 8 connected to the plate electrode 5 and gride electrode 4, respectively. A condenser 9 is provided for insulating the antenna 7 from the high voltage. The electrodes of the tube are isolated from the ground by means of choke coils 10, 11, and 12 connected as shown. A grid lead 13 is provided for maintaining proper bias on the control grid 4. For purposes of explaining the invention I have shown a filament battery A connected through resistors 14 and 15 for cutting down the voltage supplied from battery A to the value required for energizing heater 2. Switch 16 is provided for opening and closing the heater circuit. The source of high potential B is provided for energizing the anode 5 and the screen grid 6. The resistor 86 is normally shunted by the contacts 80 of the test switch 78 on the instrument panel 63, but upon opening contacts 80 by movement of control knob 79 resistor 88 is inserted in circuit with the screen grid 6, thereby producing a fluctuation in the anode current and delivering a pulse to armature winding 35 which serves to operate shutter 67 and render the light source visible to the observer. Thus, even without approaching a marker beacon, a pilot may determine whether the indicating instrument is in operative position and prepared to deliver a flash signal when the pilot passes through the projected beam of the marker beacon station.

The condenser 90 serves as a by-pass capacity for lowering the plate circuit resistance. The output circuit contains the output transformer 17 having primary winding 18 in circuit with anode 5 and secondary winding 19 in circuit with the input terminals of the rectifier system 20. The output terminals of the rectifier system 20 connect to binding posts 58 on the instrument case which in turn connect with armature winding 55. To provide for the operation of a neon tube indicator, I provide a potentiometer 21 which connects to neon tube 22 and serves to polarize the tube just below the point or voltage for which the gaseous discharge starts. After detection, the audio component builds sufficient additional alternating voltage across the transformer to flash the neon tube.

When it is desired to know if the receptor is operating properly, the switch contacts 80 are closed by pressing the test switch 29. The said switch contacts 80 are closed in normal position and shunt the resistor 88. When the button is pressed, this resistor is introduced in the screen circuit and changes suddenly the value of the screen grid voltage, which in turn produces a sudden fluctuation in the plate current. The electric impulse is rectified by the rectifier 20 and produces a sudden deflection of the arm in the meter. When the button 79 is released, the switch shunts the resistor 88 again and another impulse is produced in the meter. The same switch 16 closes the circuit through battery A and both the filament 2 of the battery and the lamp 60 shown in the diagram of connections, Fig. 5.

An important feature of my invention is the provision of the cartridge type light source insertable endwise into and removable from the instrument case.

The indicator system of my invention has proven highly practical and successful in its operation and while I have shown my invention in certain of its preferred embodiments, I desire that it be understood that modifications may be made within the scope of the appended claims without departing from the spirit of my invention.

What I claim as new and desire to secure by Letters Patent of the United States is as follows:

1. An indicating instrument comprising a case, magnetic means mounted in said case, an armature member mounted adjacent said magnetic means, a shutter member actuated by said armature member, a panel member connected with said case and having an aperture therein adjacent said shutter member, a light source insertable into and removable from said case through said panel member, and means in said case for directing light rays from said light source through the aperture in said panel, said light rays being normally obstructed by said shutter member and adapted to be rendered visible upon energization of said armature for shifting said shutter member.

2. An indicating instrument comprising a case, magnetic means disposed within said case, an armature member angularly movable with respect to said magnetic means, a shutter member controlled by the movement of said armature member, an instrument panel forming part of said case, said instrument panel having a light emitting aperture therein, an insertable and removable tubular lamp housing constituting a light source for directing light rays through the aperture in the instrument panel, a tubular socket structure carried by said instrument panel for receiving said tubular lamp housing, and opaque means detachably connectible with the exterior of the instrument panel adjacent said tubular socket structure, said shutter member operating to normally obstruct the passage of light rays through the aperture in the instrument panel and being controllable by said armature member whereby said shutter is displaced out of alignment with the aperture in said instrument panel for effecting a flash signal.

3. An indicating instrument comprising a case, a panel structure closing one side of said case, a shutter member for opening or closing a light aperture in said panel structure, a cartridge type lighting device insertable or removable through the front of said panel structure in a position substantially offset from axial alignment with said light aperture and means in said case for directing light rays from said cartridge type lighting device to the light aperture in said panel.

4. An indicating instrument comprising a case, a wall member closing one side of said case and apertured for the passage of light rays therethrough, means for closing or opening the apertured portion of said wall member, a light source insertable into and removable from said case through the front of said wall member and means for directing light rays from said light source to the apertured portion of said wall member.

5. An indicating instrument comprising a case, a wall member closing one side of said case, said wall member being apertured for the passage of light rays therethrough, a shutter member shiftable from a position normally obstructing the passage of light rays through the apertured portion of said wall member, a light source insertable into or removable from said case through an aperture in the front of said wall member, an opaque removable closure member attachable to the front of said wall member for closing said last mentioned aperture and means for causing the light from the source to be projected through the apertured portion of said wall member when said shutter member is shifted from normal position.

CONSTANTIN D. BARBULESCO.